United States Patent
Armistead, III et al.

(10) Patent No.: US 12,524,030 B2
(45) Date of Patent: Jan. 13, 2026

(54) PROGRAMMABLE SYSTEM TDP WITH ASIC POWER CAPPING

(71) Applicant: Google LLC, Mountain View, CA (US)

(72) Inventors: Robert Ashby Armistead, III, Los Altos, CA (US); Shuai Jiang, San Jose, CA (US); Binayak Roy, Santa Clara, CA (US); Thomas James Norrie, San Jose, CA (US); Houle Gan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 397 days.

(21) Appl. No.: 17/744,025

(22) Filed: May 13, 2022

(65) Prior Publication Data

US 2022/0269297 A1    Aug. 25, 2022

Related U.S. Application Data

(63) Continuation of application No. 16/996,405, filed on Aug. 18, 2020, now Pat. No. 11,334,103.

(51) Int. Cl.
*G05F 1/575* (2006.01)
*H02P 3/08* (2006.01)

(52) U.S. Cl.
CPC ............... *G05F 1/575* (2013.01); *H02P 3/08* (2013.01)

(58) Field of Classification Search
CPC .................................. G05F 1/575; H02P 3/08
See application file for complete search history.

(56) References Cited

U.S. PATENT DOCUMENTS

| | | | |
|---|---|---|---|
| 2011/0227513 A1* | 9/2011 | Onuma | H02P 3/18 318/375 |
| 2018/0048320 A1* | 2/2018 | Zanetta | H02M 3/156 |
| 2019/0041951 A1* | 2/2019 | Shapira | G06F 1/3287 |
| 2019/0123648 A1* | 4/2019 | Huang | G05F 1/56 |

FOREIGN PATENT DOCUMENTS

WO    2019212541 A1    11/2019

OTHER PUBLICATIONS

Extended European Search Report for European Patent Application No. 21156135.2 dated Jul. 15, 2021. 7 pages.
European Office Action for Appl. No. 21156135.2 dated Feb. 21, 2024. 6 pages.

\* cited by examiner

*Primary Examiner* — Zoheb S Imtiaz
(74) *Attorney, Agent, or Firm* — Lerner David LLP

(57) ABSTRACT

A programmable thermal dissipation power (TDP) system with integrated circuits is provided. The programmable TDP system includes a software interface, a monitoring circuit, and a controller circuit. The monitoring circuit may provide for the instantaneous input power supplied to the system. The controller circuit may monitor both the target TDP information specified from upstream and the input power readings. The controller circuit may generate a pulse-width modulation (PWM) signal that corresponds to a gap between the two power levels and sends the signal to the integrated circuits on the system. The integrated circuit may respond to the change in the input PWM signal and may adjust its power consumption. For example, the integrated circuit may adjust the clock frequency, adjust the instruction rate, skip a number of clock cycles, etc.

18 Claims, 8 Drawing Sheets

PROGRAMMABLE SYSTEM TDP WITH ASIC POWER CAPPING

CROSS-REFERENCE TO RELATED APPLICATIONS

The present application is a continuation of U.S. patent application Ser. No. 16/996,405, filed Aug. 18, 2020, the disclosure of which is incorporated herein by reference.

BACKGROUND

The thermal dissipation power (TDP) of an electronic system is the maximum power consumption for which its upstream power supply unit (PSU) needs to provision. In ideal cases, the PSU will accommodate 100% of the TDP combined from all systems connected to it with an additional safety margin. However, in practice, a PSU with a lower capacity is usually preferred or required. One possible scenario is that the chance that all connected systems would simultaneously be running at the full TDP level is small, so budgeting for this simultaneous full TDP level results in a significant overdesign. In another example, there may be limitations on the PSU and/or systems, whether physically, electrically, or thermally, that prevent the full-capacity PSU from being implemented.

BRIEF SUMMARY

The present disclosure provides for a programmable thermal dissipation power (TDP) system, and a method of dissipating thermal power.

One aspect of the disclosure provides a programmable thermal dissipation power (TDP) system. The system may include on-board hardware, a monitoring circuit configured to measure power used by a plurality of components, the monitoring circuit being electrically connected to the on-board hardware, an integrated circuit, and a main control circuit. The main control circuit may include a decision-making element, a power brake, and the monitoring circuit, the power brake having an internal control circuit including a controller, an actuator, and a feedback element, at least the actuator being an on-die actuator located within the integrated circuit. The main control circuit may be configured to respond to a change in an output of the monitoring circuit by applying, removing, or adjusting a power limitation of the power used by the plurality of components, the power limitation being stored within the on-board hardware.

The plurality of components may be a plurality of batteries. The system may include plurality of components. The system may be configured to implement an oversubscription strategy to manage the power used by the plurality of components powered by a single power supply unit (PSU), the single PSU having a power capacity that is less than a sum of TDPs of the plurality of components. The power brake may include a pulse-width modulation (PWM) generator that is configured to send a PWM signal to the on-die actuator that corresponds to a gap between the power used by the plurality of components and the power limitation stored within the on-board hardware.

The power brake may include a power throttle digital compensator within the integrated circuit that is configured to send a digital power throttle command to the on-die actuator that corresponds to a gap between the power used by the plurality of components and the power limitation stored within the on-board hardware. The control circuit may include a host computer within the on-board hardware that is configured to store the power limitation. The on-die actuator may be configured to adjust the power being used by the plurality of components by adjusting a clock frequency, adjusting an instruction rate, or skipping a number of clock cycles. The main control circuit may be configured to adjust the power being used by the plurality of components to a new stable power level with a configurable response time. The controller, the actuator, and the feedback element of the internal control circuit may all be located within the integrated circuit.

Another aspect of the disclosure provides a method of dissipating thermal power. The method may include receiving, by a monitoring circuit electrically connected to on-board hardware having one or more processors, power measurements correlated to power being used by a plurality of components. The method may also include identifying power limitations for the plurality of components and comparing, by the one or more processors, the received power measurements against the power limitations for the plurality of components. The method may also include determining, based on the comparison, whether to apply or remove the power limitations to the power being used by the plurality of components. The method may also include commanding, by an on-die actuator located within an integrated circuit, the plurality of machines to apply or remove the power limitations to the power being used by the plurality of components.

The commanding may include tracking the power being used by the plurality of components to the identified power limitations within a specified tolerance range, and the tracking may complete within a specified response time. The plurality of components may be a plurality of batteries. The method may implement an oversubscription strategy to manage the power used by the plurality of components powered by a single power supply unit (PSU), the single PSU having a power capacity that is less than a sum of TDPs of the plurality of components. The method may also include the on-die actuator adjusting the power being used by the plurality of components by adjusting a clock frequency, adjusting an instruction rate, or skipping a number of clock cycles. The method may also include adjusting the power being used by the plurality of components to a new stable power level with a configurable response time.

The one or more processors and the integrated circuit may be part of a main control circuit including a decision-making element, a power brake, and a monitoring circuit, the power brake having an internal control circuit including a controller, the actuator, and a feedback element. The controller, the actuator, and the feedback element of the internal control circuit may all be located within the integrated circuit. The method may also include sending, by a pulse-width modulation (PWM) generator within the power brake, a PWM signal to the on-die actuator that corresponds to a gap between the power used by the plurality of components and the identified power limitations. The method may also include sending, by a power throttle digital compensator of the power brake within the integrated circuit, a digital power throttle command to the on-die actuator that corresponds to a gap between the power used by the plurality of components and the identified power limitations.

DETAILED DESCRIPTION

Figure 1:
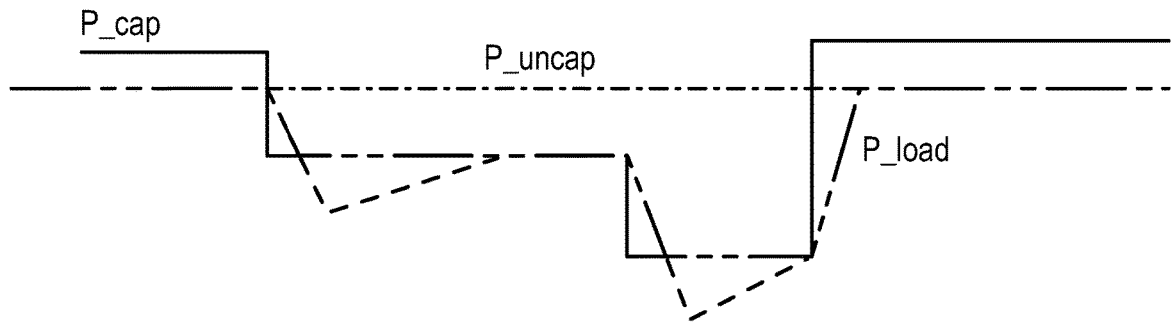
FIG. 1 shows an illustration of a high-level goal for an example programmable TDP system, in accordance with aspects of the disclosure.

Programmable thermal dissipation power (TDP) refers to a design in which the TDP of a system is programmable through a software interface. This feature enables a variety of uses, including but not limited to:

Implementing an oversubscription (OSR) strategy for a cluster of systems powered by the same PSU. OSR is used to describe the use condition in which the PSU's capacity is less than the sum of TDP of all systems connected. When power demand surges beyond the PSU capacity, the TDP of selected systems could be capped to ensure functionality of the entire cluster.

With a programmable TDP, a user may fine tune the TDP of each individual system in the cluster based on any customized optimization metric, such as best performance-to-power ratio, best energy proportionality, or best thermal margin.

A programmable TDP may enable a form-factor or environment-limited system design, such as a peripheral component interconnect express (PCIe) card, whose power consumption is limited by the maximum allowable power delivered through the PCIe interface. A programmable TDP may also enable the deployment of a high-power system in both a thermally-friendly and a challenging environment, in which the feature can be enabled in the latter case.

A programmable TDP is more sophisticated than conventional power throttling features. Power throttling usually refers to a gradual or abrupt reduction in power consumption due to protective reasons, such as to prevent thermal shutdown from excessive power consumption. In some cases, such a reduction is prescribed in how much of a percentage of the power is reduced. For example, in an over-temperature warning event, an initial 50% of power may be reduced to quickly cool the component. Instead, a programmable TDP may provide a fine-tuning knob that specifies exactly how much power will be consumed, possibly in Watts. When the software specifies a predetermined Watt consumption for the TDP, a control loop in the system will ensure the system power is at the closest possible level to this predetermined Wattage. As mentioned above, this is not purely for a "protective" purpose. This is to provide a fine-resolution knob that can be used for various purposes.

One example provides an approach for design of a programmable TDP system with application-specific integrated circuits (ASICs) or any other integrated circuit such as a CPU on them. The design includes a software interface, a monitoring circuit, and a controller circuit.

The software interface may be an interface between the managing unit on the system (e.g., a BMC or MCU) and the managing software of the upstream PSU (e.g., data center power management software). The upstream software may generate the TDP level based on the application cases and use conditions. It then may specify the TDP level through this interface and may store the info into the managing unit on the system.

The monitoring circuit may provide for the instantaneous input power supplied to the system.

The controller circuit may monitor both the target TDP information specified from upstream and the input power readings. The controller circuit may generate a pulse-width modulation (PWM) signal that corresponds to the gap between the two power levels and sends the signal to the integrated circuits on the system.

The integrated circuit may respond to the change in the input PWM signal and may adjust its power consumption. For example, the integrated circuit may adjust the clock frequency, adjust the instruction rate, skip a number of clock cycles, etc.

When every component is working, the control loop may fix the system power consumption at a level closest to that specified by the upstream software. Certain protocols need to be satisfied when the TDP target is changed through the software interface, such as signal timing and staggering schemes.

the techniques described in the present disclosure avoid requiring a fully-provisioned worst-case power level at all levels of the system, such that over-throttling and the resulting performance loss may be avoided. Moreover, the present disclosure enables oversubscription (OSR) features at all levels of the system, including a DC/cluster-level OSR, a rack level rectifier OSR, a rack level battery OSR, a tray-level VR capacity OSR, or a tray level OCP protection.

FIG. 1 illustrates an example output for an example programmable TDP system according to the disclosure, in which the power load may be a chip, tray, rack, pod, cluster, or the like. When an input command is received, for example, "cap the load at P_cap Watts," a conventional power capping system may produce the power lines 10 and 11, in which the system over-throttles the power, temporarily driving the power lower than necessary. A more desirable response according to the disclosure may produce the power lines 20 and 21, in which the system does not over-throttle the power, so the minimum power level is higher than the corresponding power lines 10 and 11. The high-level goal of the system would be that the power load is equal to the uncapped power, unless a command is received to cap the power, in which case the power load should be reduced to be equal to or not much lower than to the capped power command, i.e., the power load does not go below the capped power command by a substantial amount. It is desirable that all voltage rail noises (0.8V to 48V) be benign during the power level transitions.

Figure 2:
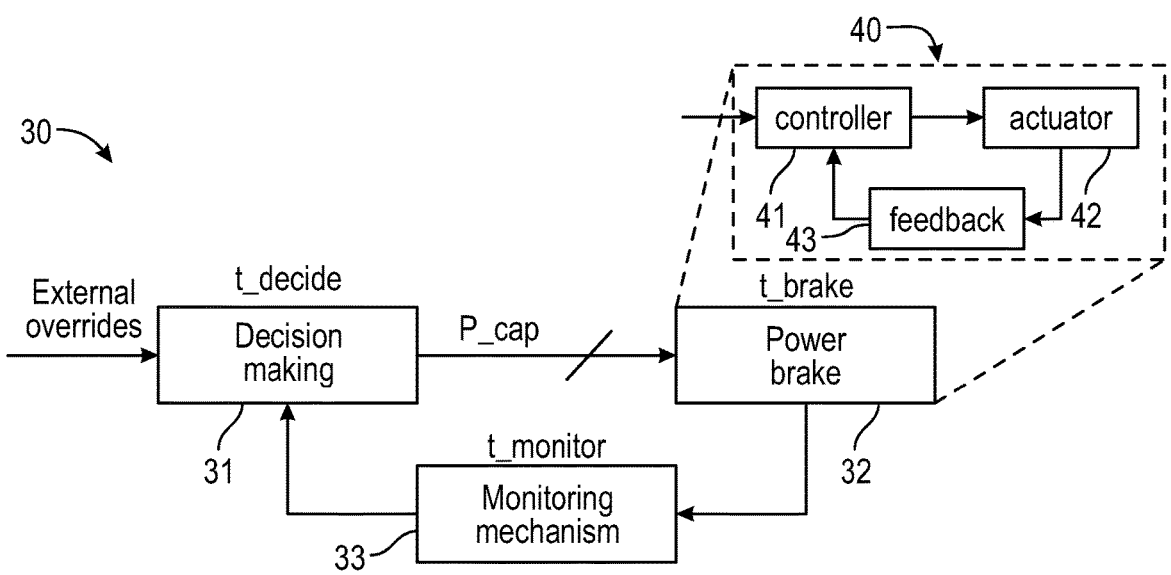
FIG. 2 shows an illustration of a control loop for executing the example programmable TDP system of FIG. 1, in accordance with aspects of the disclosure.

FIG. 2 shows an illustration of a main control loop 30 for executing the example programmable TDP system of FIG. 1. In this example, the main control loop 30 includes three blocks: a decision-making block 31, a power brake block 32, and a monitoring mechanism block 33. External overrides are an input into the decision-making block 31. The decision-making block 31 implements a power cap "P_cap" when circumstances require the system temperature to be reduced. This leads to the power brake block 32, which uses its own internal control loop 40. The power brake block 32 leads to the monitoring mechanism block 33, which leads back to the decision-making block 31 when a temperature regulation decision needs to be made.

The three components of the main control loop 30 may be implemented using various configurations of software and/or hardware. The time delay requirements (t_decide, t_brake, and t_monitor) may be the same or different from one another. The power brake block 32 has its own internal control loop 40 to ensure that the power load "P_load" is reduced to equal the power cap "P_cap" during the allotted time "t_brake." In this example, the internal control loop 40 includes three blocks: a controller block 41, an actuator block 42, and a feedback block 43.

Example settings for the time delay requirements t_decide, t_brake, and t_monitor may be as shown in the examples listed in Table 1 below.

TABLE 1

| Purpose | t_decide | t_brake | t_monitor |
|---|---|---|---|
| Chip OCP protection | ~200 ns | <200 ns | <50 ns |
| Cluster throttling | <5 s | <200 ns | ~1 s |
| Rack-level battery over-provisioning | ~5 ms | 10 s of µs | ~1 ms |

An example implementation of the programmable TDP system of FIGS. 1 and 2 will now be discussed. The decision-making block 31 and the monitoring mechanism block 33 may each be implemented in on-board hardware, for which the time delay settings may be in milliseconds, seconds, etc. The main control loop 30 may be implemented outside of a chip, and the P_cap setting may depend on whether the implementation uses on-board hardware or other software.

Figure 3A:
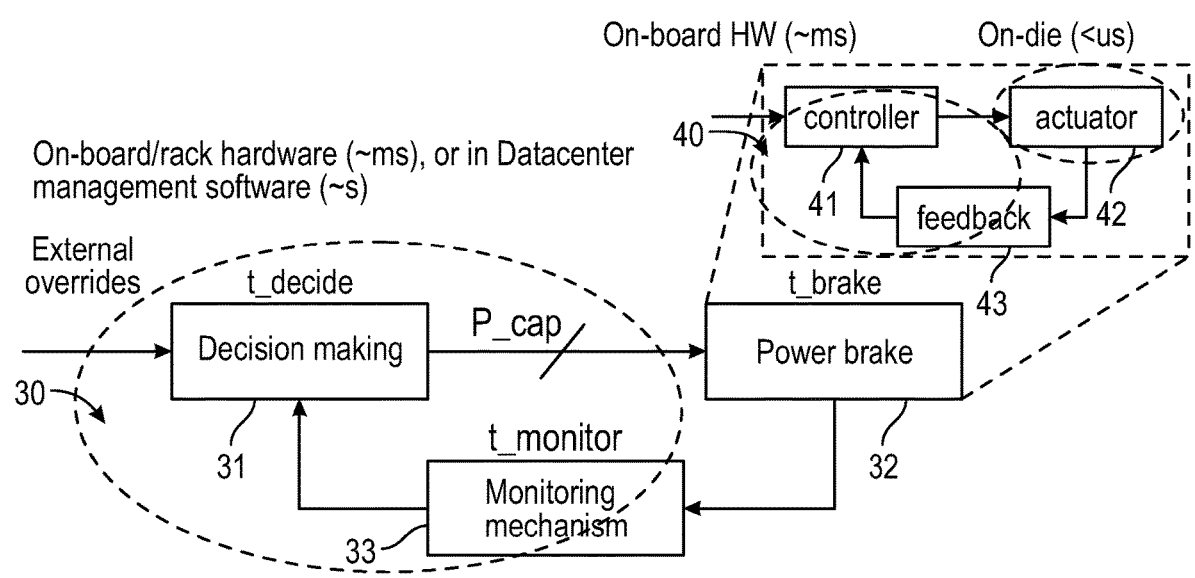
FIGS. 3A and 3B show an illustration of an example battery implementation of the power brake block of FIG. 2, including the internal control loop.
Figure 3B:
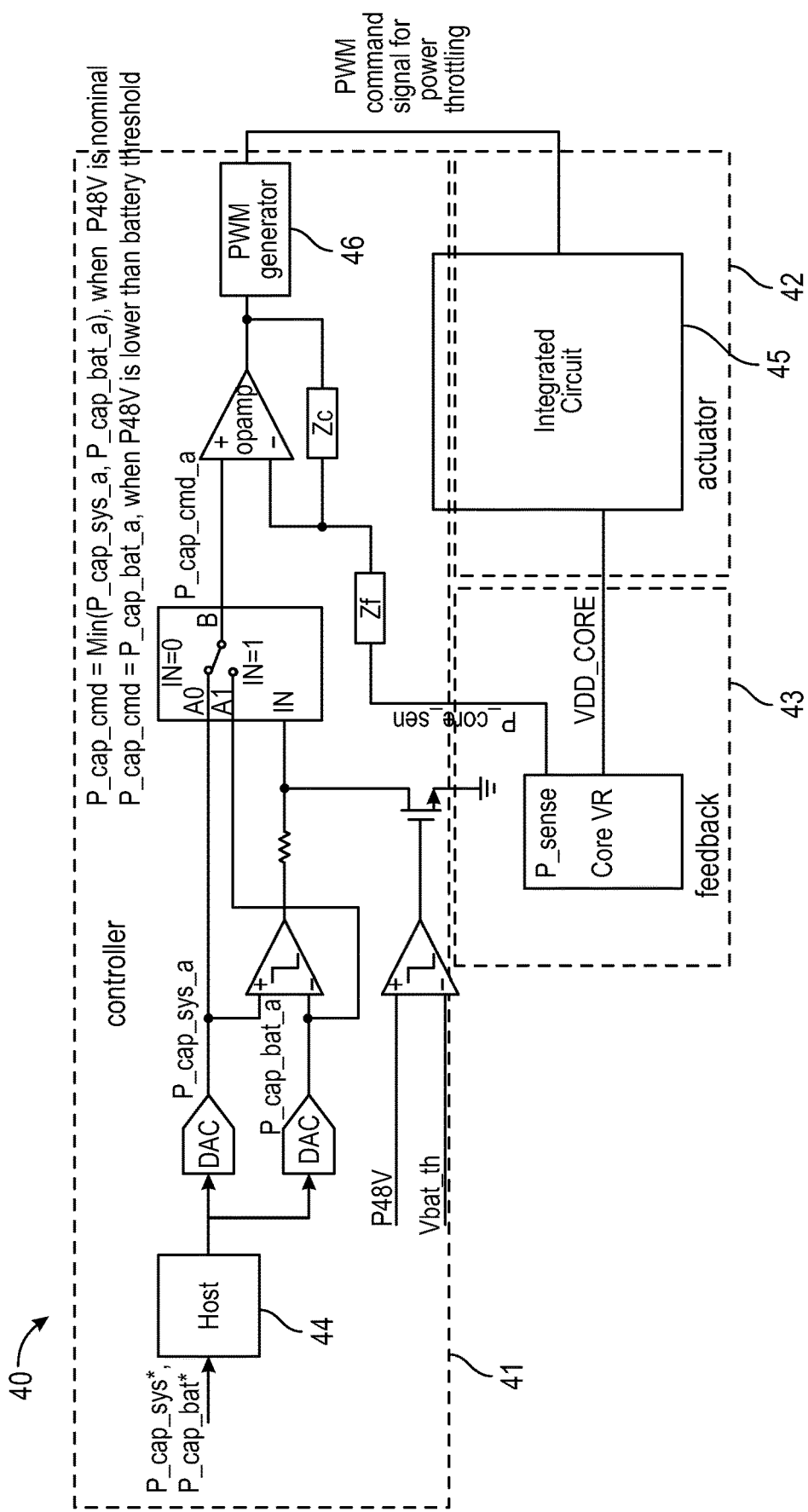

FIGS. 3A and 3B show an illustration of an example implementation of the power brake block 32, including the internal control loop 40. In this implementation, within the internal control loop 40, the controller block 41 and the feedback block 43 may each be implemented in on-board hardware, for which the time delay settings may be in milliseconds, and the actuator block 42 may be implemented on-die, for which the time delay setting may be in microseconds or less. Here, the main control loop 30 is outside of a chip, and the software or on-board hardware decides P_cap.

The internal control loop 40 of the power brake block 32 may include on-board hardware and an on-die or on-chip actuator to ensure that P_load=P_cap. A multi-bit/PWM interface may be used between the on-board hardware and an ASIC or any other integrated circuit such as a CPU. The chip or die that is used does not need to know its power, nor does it need to control its power to a specific value. Rather, the chip or die provides a way to increase or decrease its power.

A host computer 44 stores values for "P_cap_sys*" that comes from OSR system control, refreshed every a few seconds, and "P_cap_bat*" that is the maximum allowed power in battery mode. Within the controller 41, when the battery voltage "P48V" drops below the minimum allowed threshold value ("Vbat_th"), a PWM command signal is sent from the a PWM generator 46 in the controller to the actuator 42 to throttle the system power.

In this example, the actuator 42 is implemented on integrated circuit 45. When the battery voltage P48V has increased above the threshold value Vbat_th, a PWM command signal is sent to remove the system power throttling and allow the system power to increase. The hardware loop response time is less than 100 µs, primarily limited by the P_sense . . . speed.

Figure 4:
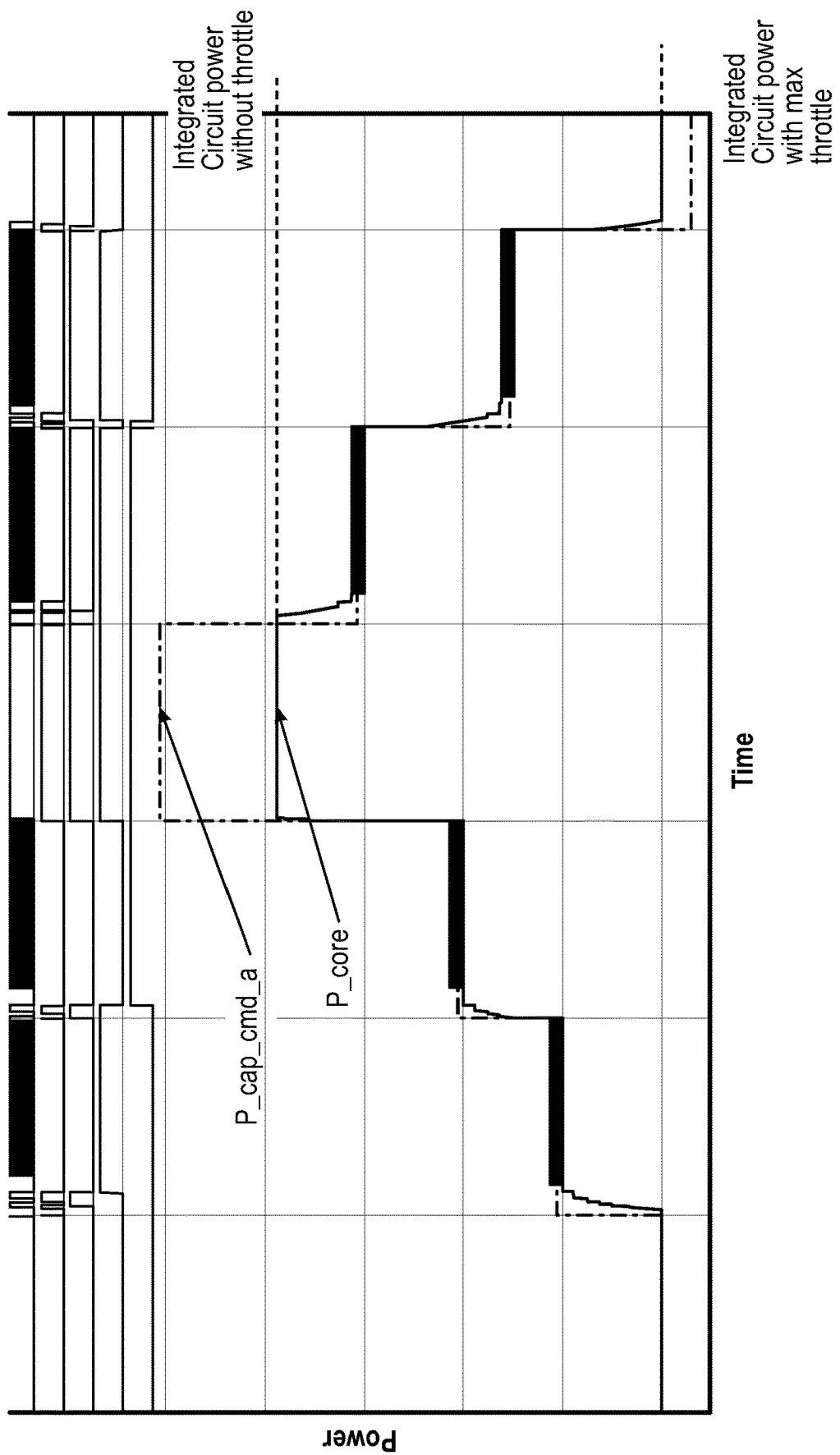
FIG. 4 shows a graph of a simulated time response of the example battery implementation of FIG. 3.

FIG. 4 shows a graph of a simulated time response of the example implementation of the internal control loop 40 of the power brake block 32. In this example, a 5-bit power throttle control command is sent to the integrated circuit 45, assuming a linear mapping to "P_core" in the simulation. As can be seen in FIG. 4, the maximum allowed power "P_cap_cmd_a" is changed every 500 µs based on the command signal that is sent. Each time that the power cap is changed, the power of the integrated circuit 45 takes less than 100 µs to increase or decrease power. This is within the range between integrated circuit power without throttle and integrated circuit minimum power with maximum throttle.

Figure 5:
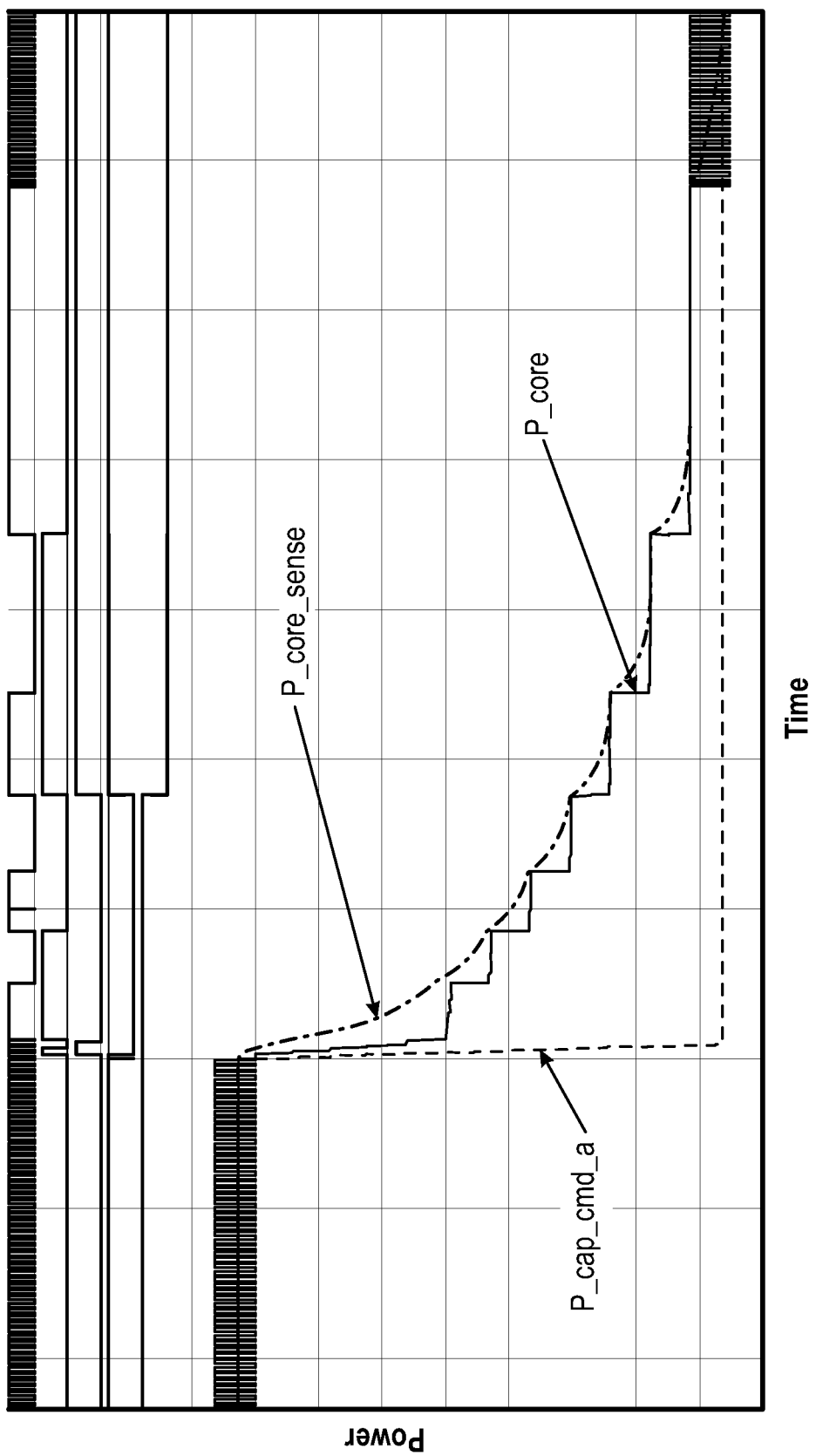
FIG. 5 shows an enlarged portion of the graph of FIG. 4.

FIG. 5 shows an enlarged portion of the graph of FIG. 4, including the "P_core_sense" values. As can be seen in FIG. 5, the time period covered is about 90 µs. The maximum allowed power "P_cap_cmd_a" is reduced from full load to about 60% load level in a few ms. The integrated circuit 45 power settling time from the 5-bit digital throttle command is less than 50 ns. The integrated circuit 45 power sense (P_core_sense) delay from actual power (P_core) is a couple µs. The integrated circuit 45 power response to P_cap_cma_a is less than 100 µs, which is the time between when the throttle signal is received to when the power reduction is implemented. At steady state, P_core will be bouncing between 2 LSB throttling levels. In this example, the P_core bounces between "01100" and "01101".

Figure 6A:
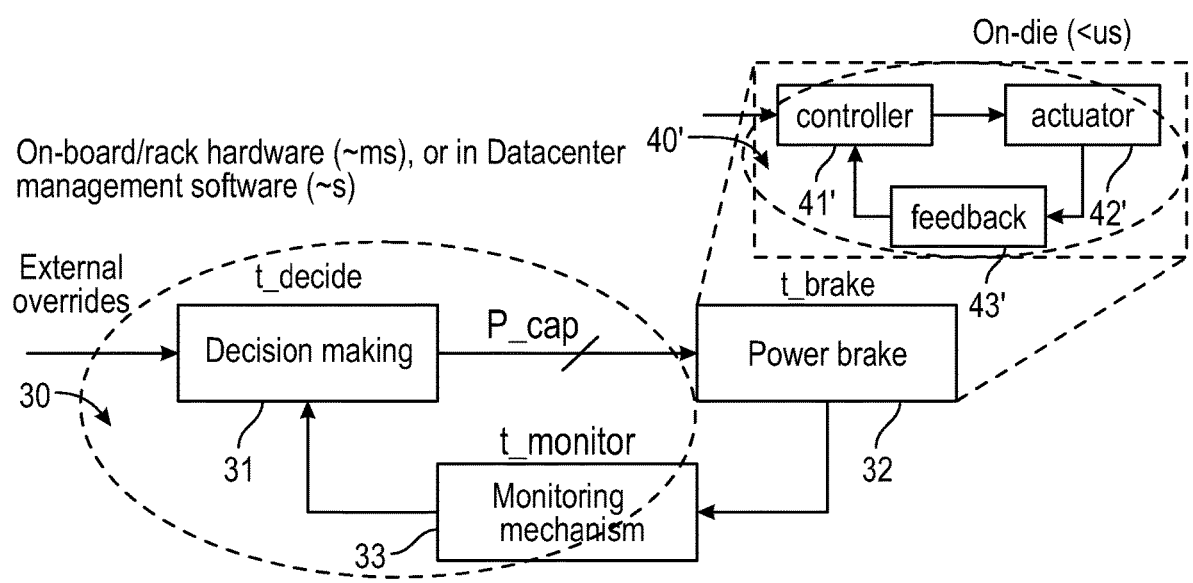
FIGS. 6A and 6B show an illustration of an alternative example battery implementation of the power brake block of FIG. 2, including the internal control loop, in accordance with aspects of the disclosure.
Figure 6B:
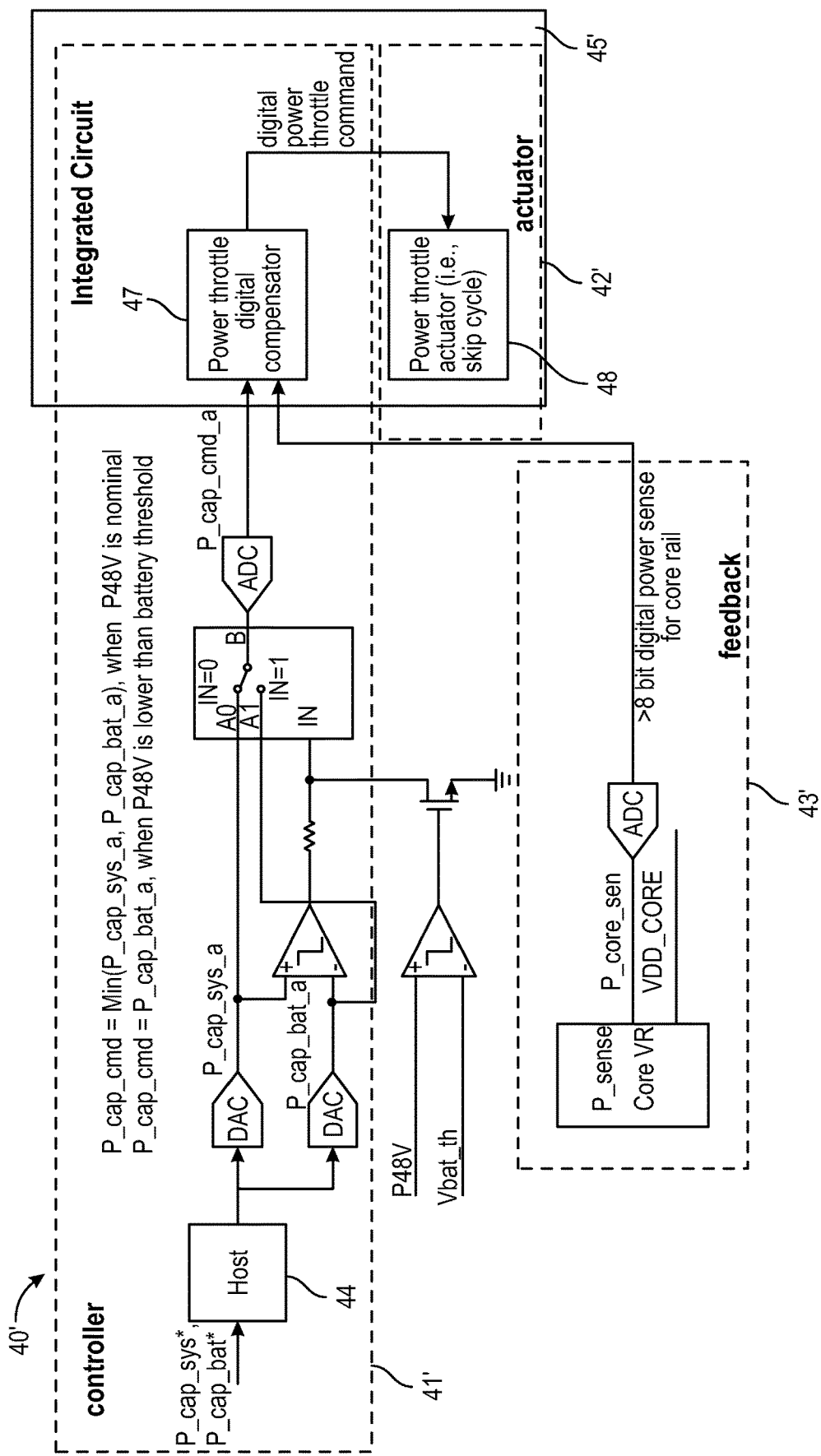

FIGS. 6A and 6B show an illustration of an alternative example implementation of the power brake block 32, including the alternative internal control loop 40'. In this implementation, a larger portion of the internal control loop 40' is implemented on-die, for which the time delay setting may be in microseconds or less.

In this variation, P_cap is directly fed into the integrated circuit from the host computer 44. The integrated circuit may need to obtain external information for the on-die internal control loop 40'. Examples of such information include real-time integrated circuit power, tray power, voltage level, etc. Compared to the internal control loop 40, this variation may add on-die design complexity.

In the internal control loop 40', the actuator block 42' and a portion of the controller block 41' may be implemented on-die. Similar to the internal control loop 40, a host computer 44 stores values for "P_cap_sys*" that comes from OSR system control, refreshed every a few seconds, and "P_cap_bat*" that is the maximum allowed power in battery mode. Within the controller 41', when the battery voltage "P48V" drops below the minimum allowed threshold value ("Vbat_th"), a digital command signal is sent from the a power throttle digital compensator controller 47 in the controller to a power throttle actuator 48 in the actuator 42' to throttle the system power.

In this example, the power throttle digital compensator controller 47 and the power throttle actuator 48 are implemented on an integrated circuit 45'. When the battery voltage P48V has increased above the threshold value Vbat_th, a PWM command signal is sent to remove the system power throttling and allow the system power to increase. The hardware loop response time is this implementation may be between 10-20 µs, primarily limited by the P_sense speed.

Figure 7:
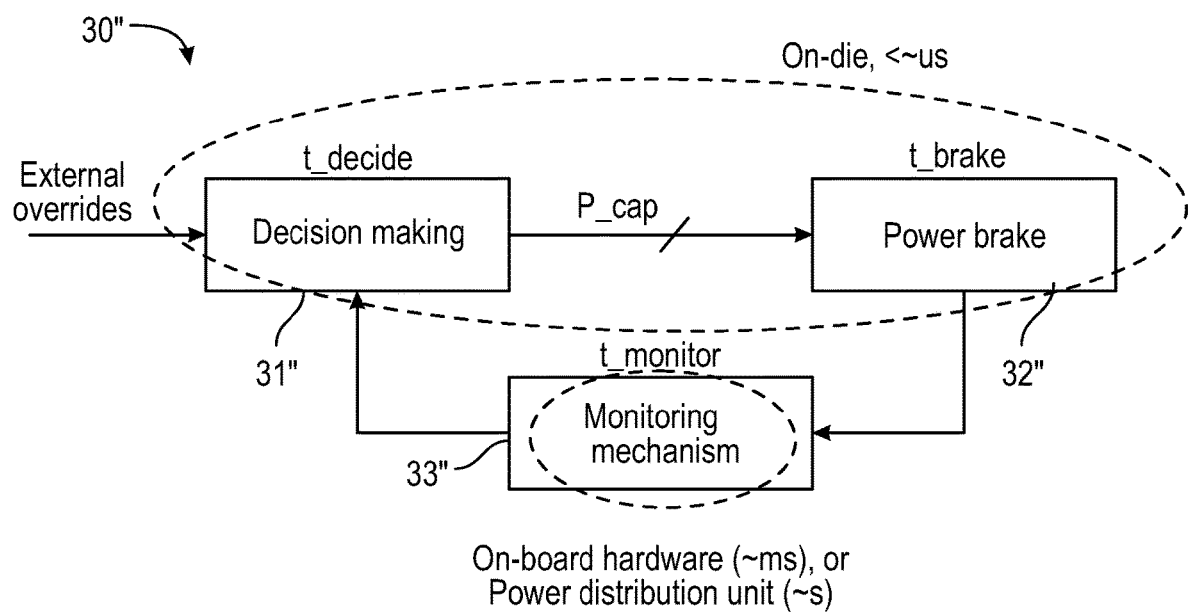
FIG. 7 shows an illustration of an alternative example battery implementation of the main control loop of the TDP system of FIG. 1, in accordance with aspects of the disclosure.

FIG. 7 shows an illustration of an alternative example implementation of the main control loop 30". In this implementation, the decision-making block 31" and the power brake 32" are both located on-die, for which the time delay setting may be in microseconds or less. Here, the system/ integrated circuit interface can become complex, requiring lots of information to input to the integrated circuit to make the throttling decision. Input could come from a power distribution unit (PDU) meter, battery reporting, and might include info such as priority of the current workload. The integrated circuit may calculate its own P_cap based on all inputs. This approach may have added complexities given the multiple use cases and different time scale.

Another example implementation of the programmable TDP system of FIG. 1 is a battery oversubscription system, using a battery model having a voltage source with output R that changes slightly with output current.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A power brake, comprising:
    a controller configured to receive an indication of power used by a plurality of components;
    an actuator; and
    a feedback element;
    wherein the controller includes a pulse-width modulation (PWM) generator that is configured to send a PWM signal to the actuator that corresponds to a gap between the power used by the plurality of components and a power limitation stored within on-board hardware,
    wherein the actuator is configured to respond to the PWM signal by throttling the power used by the plurality of components.

2. The power brake of claim 1, wherein the plurality of components is a plurality of batteries.

3. The power brake of claim 1, wherein the controller is configured to implement an oversubscription strategy to manage the power used by the plurality of components powered by a single power supply unit (PSU), the single PSU having a power capacity that is less than a sum of thermal dissipation power of the plurality of components.

4. The power brake of claim 1, wherein the power brake includes a power throttle digital compensator that is configured to send a digital power throttle command to the actuator that corresponds to a gap between the power used by the plurality of components and the power limitation stored within the on-board hardware.

5. The power brake of claim 1, wherein the actuator is configured to adjust the power being used by the plurality of components by adjusting a clock frequency.

6. The power brake of claim 1, wherein the actuator is configured to adjust the power being used by the plurality of components by adjusting an instruction rate.

7. The power brake of claim 1, wherein the actuator is configured to adjust the power being used by the plurality of components by skipping a number of clock cycles.

8. The power brake of claim 1, wherein the actuator is an on-die actuator.

9. The power brake of claim 1, wherein the main control circuit is configured to adjust the power being used by the plurality of components to a new stable power level with a configurable response time.

10. The power brake of claim 1, wherein the controller, the actuator, and the feedback element are all located within an integrated circuit.

11. A method of dissipating thermal power, the method comprising:
    receiving, by a monitoring circuit electrically connected to on-board hardware having one or more processors, power measurements correlated to power being used by a plurality of components;
    identifying power limitations for the plurality of components;
    determining, based on the received power measurements and the power limitations for the plurality of components, whether to apply, remove, or adjust the power limitations to the power being used by the plurality of components;
    sending, by a pulse-width modulation (PWM) generator, a PWM signal to an actuator that corresponds to a gap between the power used by the plurality of components and the identified power limitations; and
    applying, removing, or adjusting, using the actuator, the power limitations to the power being used by the plurality of components.

12. The method of claim 11, further comprising tracking the power being used by the plurality of components to the identified power limitations within a specified tolerance range.

13. The method of claim 12, wherein the tracking completes within a specified response time.

14. The method of claim 11, wherein the plurality of components is a plurality of batteries.

15. The method of claim 11, wherein the method implements an oversubscription strategy to manage the power used by the plurality of components powered by a single power supply unit (PSU), the single PSU having a power capacity that is less than a sum of thermal dissipation power of the plurality of components.

16. The method of claim 11, comprising adjusting the power being used by the plurality of components, comprising at least one of adjusting a clock frequency, adjusting an instruction rate, or skipping a number of clock cycles.

17. The method of claim 11, comprising adjusting the power being used by the plurality of components to a new stable power level with a configurable response time.

18. The method of claim 11, further comprising sending, by a power throttle digital compensator within an integrated circuit, a digital power throttle command to the actuator that corresponds to a gap between the power used by the plurality of components and the identified power limitations.

* * * * *